(12) United States Patent
Mizuno

(10) Patent No.: US 8,273,497 B2
(45) Date of Patent: Sep. 25, 2012

(54) AIR BATTERY

(75) Inventor: Fuminori Mizuno, Toyota (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/003,967

(22) PCT Filed: Jan. 26, 2009

(86) PCT No.: PCT/JP2009/051179
§ 371 (c)(1),
(2), (4) Date: Jan. 13, 2011

(87) PCT Pub. No.: WO2010/084614
PCT Pub. Date: Jul. 29, 2010

(65) Prior Publication Data
US 2011/0269056 A1  Nov. 3, 2011

(51) Int. Cl.
*H01M 4/133* (2010.01)
(52) U.S. Cl. .................................................. 429/482
(58) Field of Classification Search .................. None
See application file for complete search history.

(56) References Cited

U.S. PATENT DOCUMENTS

| | | | |
|---|---|---|---|
| 6,555,945 B1 * | 4/2003 | Baughman et al. | 310/300 |
| 2008/0176124 A1 * | 7/2008 | Imagawa et al. | 429/27 |

FOREIGN PATENT DOCUMENTS

| | | |
|---|---|---|
| JP | A 2000-133325 | 5/2000 |
| JP | A 2001-316104 | 11/2001 |
| JP | A 2001-345108 | 12/2001 |
| JP | A 2002-015737 | 1/2002 |
| JP | A 2002-015782 | 1/2002 |
| JP | A 2003-178816 | 6/2003 |
| JP | A 2005-139586 | 6/2005 |
| JP | A 2005-158350 | 6/2005 |
| JP | A 2006-222020 | 8/2006 |
| JP | A 2006-222026 | 8/2006 |
| JP | A 2007-141745 | 6/2007 |
| JP | A 2007-265916 | 10/2007 |
| JP | A 2008-059821 | 3/2008 |
| JP | A 2008-183508 | 8/2008 |
| WO | WO 02/27830 A1 | 4/2002 |

OTHER PUBLICATIONS

Abraham et al., "A polymer electrolyte-based rechargeable lithium/oxygen battery," *J. Electrochem. Soc.*, Jan. 1996, pp. 1-5, vol. 143, No. 1.
Ogasawara et al., "Rechargeable $Li_2O_2$ electrode for lithium batteries," *J. Am. Chem. Soc.*, 2006, pp. 1390-1393, vol. 128., No. 4.
International Search Report issued in PCT/JP2009/051179, mailed Apr. 7, 2009. (with English-language translation).
International Preliminary Report on Patentability issued in PCT/JP2009/051179, completed Apr. 9, 2010. (with partial English-language translation).

* cited by examiner

*Primary Examiner* — Patrick Ryan
*Assistant Examiner* — Wyatt McConnell
(74) *Attorney, Agent, or Firm* — Oliff & Berridge, PLC

(57) ABSTRACT

An air battery which is capable of improving operating voltage. The air battery includes: an air electrode containing a carbonaceous matter; an anode; and an electrolyte layer containing an electrolyte which conducts ions between the air electrode and the anode, the D/G band ratio X of the carbonaceous matter being $0.058 \leq X \leq 0.18$.

6 Claims, 2 Drawing Sheets

AIR BATTERY

TECHNICAL FIELD

The present invention relates to an air battery.

BACKGROUND ART

Air battery is a battery comprising oxygen as a cathode active material and the battery takes in air from outside at a time of discharge. So, compared with other types of battery which include active materials of a cathode and an anode in it, it is possible to enlarge the ratio of the volume of the anode active material to the volume of the battery container. Accordingly, air battery, theoretically, has a larger dischargeable electric capacity; downsizing and weight saving of the battery can also be easily done. Moreover, since the oxidation power of oxygen to be used as a cathode active material is strong, the electromotive force of the battery is relatively high. Further, oxygen is an unlimited resource and a clean material, so the environmental burden of air battery is low. In this way, air battery has many advantages and therefore expected to be used as, for example, a battery for mobile phone, a battery for electric vehicle, a battery for hybrid car, and a battery for fuel cell vehicle.

As the conventionally proposed air batteries, the nonaqueous electrolyte-type air battery using metal lithium as an anode material and oxygen as an air electrode material is known.

In the nonaqueous electrolyte-type air battery, oxygen is reduced to be $Li_2O_2$ or $Li_2O$ at the air electrode during discharge reactions. These reactions can be shown as follows.

$$2Li^+ + O_2 + 2e^- \longrightarrow Li_2O_2 \quad \text{(Formula 1)}$$

$$4Li^+ + O_2 + 4e^- \longrightarrow 2Li_2O \quad \text{(Formula 2)}$$

Here, Gibbs free energy $\Delta G$ of $Li_2O_2$ is $-606.68$ kJ/mol and Gibbs free energy $\Delta G$ of $Li_2O$ is $-560.66$ kJ/mol. When calculating the theoretical operating voltage by using these values and a formula: $\Delta G = -nFE$, the theoretical operating voltage of $Li_2O_2$ is 3.1 V, and the theoretical operating voltage of $Li_2O$ is 2.9 V. However, the actual operating voltage of the conventional nonaqueous electrolyte-type lithium air battery is not more than 2.6 V. The reason is assumed that the overvoltage increases due to the large activation barrier required for oxygen reduction, as a result, the actual operating voltage is lower than the theoretical operating voltage. So, if the activation barrier required for oxygen reduction can be lowered, it is presumably possible to provide an air battery which shows an actual operating voltage equivalent to the theoretical one.

As an art relates to such a nonaqueous electrolyte-type lithium air battery, for example, Patent document 1 discloses a nonaqueous electrolyte-type lithium air battery which comprises: a cathode mainly containing a carbonaceous matter of which pore volume occupied by fine pores having a diameter of 1 nm or more is 1.0 mL/g or more; an anode containing an anode active material which absorbs and discharges lithium ions; and a nonaqueous electrolyte layer sandwiched between the cathode and the anode.

CITATION LIST

Patent Literature

Patent document 1: Japanese Patent Application Laid-Open (JP-A) No. 2002-015737

SUMMARY OF THE INVENTION

Problems to be Solved by the Invention

According to the nonaqueous electrolyte-type lithium air battery of Patent document 1, since it is provided with a cathode mainly containing a carbonaceous matter of which pore volume occupied by fine pores having a diameter of 1 nm or more is 1.0 mL/g or more, it is assumed that the nonaqueous electrolyte-type lithium air battery can improve the volume of cathode. However, the actual discharge voltage of the nonaqueous electrolyte-type lithium air battery of Patent document 1 is 2.6 V, which is lower than the theoretical discharge voltages of $Li_2O_2$ and $Li_2O$: i.e. 3.1 V and 2.9 V.

Accordingly, an object of the present invention is to provide an air battery which is capable of improving the operating voltage.

Means for Solving the Problems

To solve the above problem, the present invention comprises the following means (features).

The first aspect of the present invention is an air battery comprising: an air electrode containing a carbonaceous matter; an anode; and an electrolyte layer containing an electrolyte which conducts ions between the air electrode and the anode, the D/G band ratio X of the carbonaceous matter being $0.058 \leq X \leq 0.18$.

In the invention, the term "air electrode containing a carbonaceous matter" means not only an air electrode made of only a carbonaceous matter of which D/G band ratio X is $0.058 \leq X \leq 0.18$ but also the air electrode further containing other substances represented by a catalyst. Moreover, the term "D/G band ratio X" means the abundance ratio of the diamond structure and the graphite structure in the carbonaceous matter. More specifically, the term "D/G band ratio X" is defined as a ratio of peak intensities at 1360 cm$^{-1}$ (D-band) and 1580 cm$^{-1}$ (G-band) obtained by deducting the value of base line intensity from a raman spectrum of the carbonaceous matter (i.e. carbon material). Raman spectrometry is carried out by measuring three selected points of each carbon material and then calculating the respective ratio of peak intensities. In the invention, the average of the three ratios of peak intensity is defined as D/G band ratio. In the invention, examples of "the carbonaceous matter of which D/G band ratio X is $0.058 \leq X \leq 0.18$" may be the below-described highly-oriented pyrolytic graphite. It should be noted that, depending on the measurement of D/G band ratio X, accidental error may be observed in the measurement of the same sample. So, the measurement accepts the error within the range of ±0.02 and "the carbonaceous matter of which D/G band ratio X is $0.058 \leq X \leq 0.18$" of the invention includes a carbonaceous matter of which D/G band ratio X is 0.038 and a carbonaceous matter of which D/G band ratio X is 0.20.

The second aspect of the invention is an air battery comprising: an air electrode made of a carbonaceous matter; an anode; and an electrolyte layer containing an electrolyte which conducts ions between the air electrode and the anode, the D/G band ratio X of the carbonaceous matter being $0.058 \leq X \leq 0.18$.

In the first and second aspects of the invention, the D/G band ratio X of the carbonaceous matter is preferably $X = 0.180$.

The third aspect of the invention is an air battery comprising: an air electrode containing a carbonaceous matter; an anode; and an electrolyte layer containing an electrolyte which conducts ions between the air electrode and the anode, the carbonaceous matter being a highly-oriented pyrolytic graphite.

Here, the term "highly-oriented pyrolytic graphite" in the invention is a substance also shown as "HOPG" (hereinafter, referred to as "HOPG".). The highly-oriented pyrolytic graphite of the present invention includes: an HOPG in which the face of diamond structure (Edge face) is oriented; and an HOPG in which the face of graphite structure (Basal face) is oriented.

The fourth aspect of the invention is an air battery comprising: an air electrode made of a carbonaceous matter; an anode; and an electrolyte layer containing an electrolyte which conducts ions between the air electrode and the anode, the carbonaceous matter being a highly-oriented pyrolytic graphite.

Effects of the Invention

In the first aspect of the present invention, an air electrode includes a carbonaceous matter of which D/G band ratio X is $0.058 \leq X \leq 0.18$. By using the carbonaceous matter of which DIG band ratio X is $0.058 \leq X \leq 0.18$ for an air electrode, it is possible to enhance operating voltage of the air battery; thereby, according to the first aspect of the invention, it is possible to provide an air battery which is capable of enhancing the operating voltage.

In the second aspect of the present invention, an air electrode made of a carbonaceous matter of which DIG band ratio X is $0.058 \leq X \leq 0.18$. By using the carbonaceous matter of which D/G band ratio X is $0.058 \leq X \leq 0.18$ as an air electrode, it is possible to enhance operating voltage of the air battery; thereby, according to the second aspect of the invention, it is possible to provide an air battery which is capable of enhancing the operating voltage.

In the first or second aspect of the invention, when the D/G band ratio X of the carbonaceous matter is X=0.180, the operating voltage of the air battery can be easily enhanced.

In the third aspect of the invention, an HOPG is included in the air electrode. By using the HOPG for the air electrode, it is possible to enhance the operating voltage of the air battery; thereby, according to the third aspect of the invention, it is possible to provide an air battery which is capable of enhancing the operating voltage.

In the fourth aspect of the invention, the air electrode comprises an HOPG. By using the HOPG for the air electrode, it is possible to enhance the operating voltage of the air battery; thereby, according to the fourth aspect of the invention, it is possible to provide an air battery which is capable of enhancing the operating voltage of the air battery.

DESCRIPTION OF MODES FOR CARRYING OUT THE INVENTION

As a result of intensive study by the inventor, he discovered that it is possible to improve the operating voltage of air battery from the level of the conventional air battery by using an HOPG for air electrode. Moreover, the inventor discovered that by forming the air electrode by a sheet-type HOPG, it is possible to provide an air battery which improves the operating voltage without using, for the air electrode, a catalyst which is used for the purpose of lowering the activation barrier in the conventional air battery. In addition, since the D/G band ratio X of the HOPG used for the air battery of the invention is $0.058 \leq X \leq 0.18$, together with the above findings, the inventor discovered that by using the carbonaceous matter having a D/G band ratio X of $0.058 \leq X \leq 0.18$ for an air electrode, it is possible to enhance the operating voltage of the air battery. The reason for the improvement of the operating voltage of the air battery attributed to the structure is assumed that the activation barrier related to the oxidation reduction can be lowered.

The present invention is completed based on the above findings. The primary point of the invention is to include carbonaceous matter of which D/G band ratio X is $0.058 \leq X \leq 0.18$ in the air electrode; thereby it is possible to provide an air battery which enhances the operating voltage. The secondary point of the invention is to use an HOPG for the air electrode; thereby it is possible to provide an air battery which is capable of improving the operating voltage.

Hereinafter, the present invention will be described with reference to the drawings. It should be noted that the embodiments shown below are examples of the present invention, so the invention is not limited by the embodiments.

1. The First Embodiment

Figure 1:
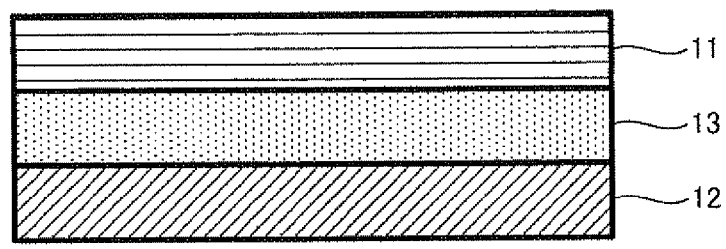
FIG. 1 is a plan schematically showing a cross section of an embodiment of air battery 10.

FIG. 1 is a plan schematically showing a cross section of the first embodiment of air battery of the present invention (hereinafter, referred to as "air battery 10"). In FIG. 1, a part of the air battery 10 is enlarged.

As shown in FIG. 1, the air battery 10 comprises: an air electrode 11; anode 12; and an electrolyte layer 13 which is disposed between the air electrode 11 and the anode 12 and which conducts ions between the air electrode 11 and the anode 12. The air battery 10 takes in oxygen from an oxygen-containing layer (not shown) disposed outside the air electrode 11 when discharging. The air battery 10 will be described on an element-by-element basis.

<Air Electrode 11>

The air electrode 11 is formed of a sheet-type HOPG and the D/G band ratio X of the HOPG is $0.058 \leq X \leq 0.18$. The HOPG constituting the air electrode may be an HOPG of which Edge face is oriented; it may also be an HOPG of which Basal face is oriented. It should be noted that to form a structure which can easily enhance the operating voltage, the HOPG of which Edge face is oriented, for example, an HOPG of which D/G band ratio X is X=0.180, is preferably used.

The thickness of the air electrode 11 is varies depending on the intended use of the air battery 10; for example, it is 2 μm or more and 2 mm or less, more preferably 5 μm or more and 500 μm or less.

In the air battery 10, the air electrode 11 does not include substances such as a catalyst and a binder used in the conventional air battery. Even if the air electrode 11 does not include such substances, by making the air electrode 11 by a sheet-type HOPG, it is possible to cause oxygen reduction reaction. In other words, in the air battery 10, the air electrode 11 which is constituted by a sheet-type HOPG functions as a catalyst and a reaction field having conductive property. Moreover, a conductive substance (not shown), which functions as a terminal when harvesting electricity from the air battery 10, is connected to the air electrode 11.

<Anode 12>

The anode 12 contains an anode active material. The anode 12 is provided with an anode current collector (not shown) for collecting current of the anode 12 so that the anode current collector contacts with the interior portion or external surface of the anode 12.

Examples of the anode active material contained in the anode 12 may be an anode active material of the conventional air battery; it is not particularly limited. When the air battery 10 is a lithium-air secondary battery, as the anode active material, an anode active material which can absorb and discharge Li-ion is used. Examples of such anode active material include: metal lithium, lithium alloy, metal oxide, metal sulfide, and metal nitride, and carbon material such as graphite. Among them, metal lithium and carbon material is preferable; to provide an air battery which can easily attain higher capacity, metal lithium is more preferable as the anode active material.

The anode 12 may be constituted by at least one anode active material; it may further contain a conductive material for improving conductive property of the anode active material and/or a binder for fixing the anode active material. In view of inhibiting the decrease of reaction field and battery capacity, the content of the conductive material in the anode 12 is preferably 10 mass % or less.

Examples of the binder which may be contained in the anode 12 include: polyvinylidene fluoride (PVdF); and polytetrafluoroethylene (PTFE). The content of the binder in the anode 12 is not particularly limited; for example, it is preferably 10 mass % or less, more preferably 1 mass % or more and 5 mass % or less.

In the air battery 10, an anode current collector is provided so that the anode current collector contacts with the interior portion or the exterior surface of the anode 12. The anode current collector has a function to collect the current generated in the anode 12. In the air battery 10, the material for the anode current collector is not particularly limited as long as it has conductive property. Examples of the material for the anode current collector include: copper, stainless steel, and nickel. Examples of the shape of the anode current collector may be foil, sheet, and mesh (i.e. grid).

<Electrolyte Layer 13>

The electrolyte layer 13 is impregnated with an electrolytic solution which conducts ions between the air electrode 11 and the anode 12. The type of electrolytic solution is not particularly limited as long as it has metal ion conductivity; for example, nonaqueous electrolytic solution can be used.

Preferably, the kind of nonaqueous electrolytic solution used for the electrolyte layer 13 is adequately selected depending on the type of conducting metal ions. For example, the nonaqueous electrolytic solution of the lithium-air battery in general contains a lithium salt and an organic solvent. Examples of lithium salt include: an inorganic lithium salt such as $LiPF_6$, $LiBF_4$, $LiClO_4$, and $LiAsF_6$; and an organic lithium salt such as $LiCF_3SO_3$, $LiN(CF_3SO_2)_2$, $LiN(C_2F_5SO_2)_2$, and $LiC(CF_3SO_2)_3$. Examples of the organic solvent include: ethylene carbonate (EC), propylene carbonate (PC), dimethyl carbonate (DMC), diethyl carbonate (DEC), ethylmethyl carbonate (EMC), butylene carbonate, γ-butyrolactone, sulfolane, acetonitrile, 1,2-dimethoxymethane, 1,3-dimethoxypropane, diethylether, tetrahydrofuran, 2-methyltetrahydrofuran; and the mixture thereof. Moreover, to efficiently use the dissolved oxygen in the reaction, the organic solvent is preferably a solvent of high oxygen solubility. The concentration of the lithium salt in the nonaqueous electrolytic solution is, for instance, 0.2 mol/L or more and 3 mol/L or less. In the air battery of the present invention, a low-volatile solution such as ionic solution can be used as a nonaqueous electrolytic solution.

In addition, in the air battery 10, a separator which holds a nonaqueous electrolytic solution is preferably disposed between the air electrode 11 and the anode 12. Examples of the separator include: a microporous membrane made of, e.g., polyethylene and polypropylene; and a nonwoven cloth such as a resin-made nonwoven cloth and a glass fiber nonwoven cloth.

<Air Battery 10>

In the air battery 10, at least the air electrode 11, the anode 12, and the electrolyte layer 13 are incorporated in a battery case (not shown).

The shape of battery case to be used for the air battery 10 is not particularly limited. The battery case may be an open type battery case or a closed (sealed) type battery case. The open type battery case is the one where the contents can contact the air. When the battery case is the closed type, a gas (air) supply tube and a gas (air) outlet tube are preferably provided to the battery case. The supplied gas and the discharged gas preferably have high oxygen concentration; these are more preferably pure oxygen. Moreover, oxygen concentration is preferably raised when discharging the battery; while, oxygen concentration is preferably lowered when charging.

Types of the air battery 10 may be: lithium-air battery, sodium-air battery, potassium-air battery, magnesium-air battery, aluminum-air battery, and calcium-air battery. Among them, lithium-air battery is preferable. The examples of intended use of the air battery 10 include: use for power source of vehicles, stationary power source, domestic power source, and power source of mobile device.

2. The Second Embodiment

Figure 2:
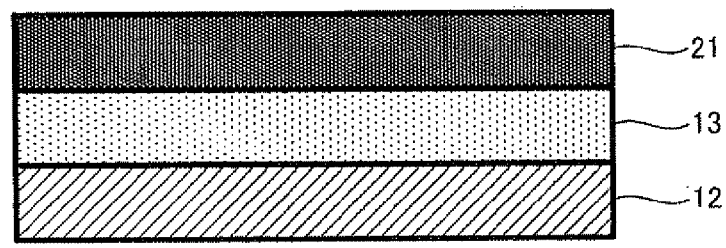
FIG. 2 is a plan schematically showing a cross section of an embodiment of air battery 20.

FIG. 2 is a plan schematically showing a cross section of the second embodiment of air battery of the present invention (Hereinafter, referred to as "air battery 20".). In FIG. 2, a part of the air battery 20 is enlarged. In FIG. 2, the elements which are in common with those of the air battery 10 are given the same reference numerals as those shown in FIG. 1, and the descriptions are omitted.

<Air Electrode 21>

The air electrode 21 contains: a powdered HOPG, a catalyst, and a binder. The DIG band ratio X of the powdered HOPG is $0.058 \leq X \leq 0.18$. Even by this embodiment, it is possible to provide an air battery 20 which enhances the operating voltage. In the air battery 20, an air electrode current collector (not shown) for collecting current generated in the air electrode 21 is disposed so that the air electrode current collector contacts with the interior portion or exterior surface of the air electrode 21.

In view of inhibiting the decrease of reaction field and battery capacity, the content of the HOPG in the air electrode 21 is preferably 10 mass % or more. Further, in view of attaining sufficient catalyst function, the content of HOPG in the air electrode 21 is preferably 99 mass % or less.

Examples of catalyst contained in the air electrode 21 include: cobalt phthalocyanine and manganese dioxide. To attain sufficient catalytic function, the content of the catalyst is preferably 1 mass % or more. In addition, in view of inhibiting decrease of reaction field and battery capacity, the amount of catalyst in the air electrode 21 is preferably 90 mass % or less.

The type and dosage of the binder to be used in the air electrode 21 may be the same as the binder contained in the anode 12.

The thickness of the air electrode 21 varies depending on the intended use of the air battery 20; for example, it is preferably 2 μm or more and 500 μm or less, more preferably 5 μm or more and 300 μm or less. To easily enhance the operating voltage, the D/G band ratio X of the HOPG to be used for the air electrode 21 is preferably X=0.180.

Moreover, as described above, in the air battery 20, the air electrode 21 is provided with an air electrode current collector so that the air electrode current collector contacts with the interior portion or external surface of the air electrode 21. The air electrode current collector has a function to correct the current generated in the air electrode 21. In the air battery 20, the material of the air electrode current collector is not particularly limited as long as it has conductive property. Examples of material for the air electrode current collector include: stainless steel, nickel, aluminum, iron, titanium, and carbon. The shape of such air electrode current collector may be, for example, foil, sheet, and mesh (i.e. grid). Among them, in the air battery 20, mesh-type current collector is preferable in view of excellent current-collecting efficiency. When using the mesh-type air electrode current collector, it is possible to dispose a mesh-type air electrode current collector inside the air electrode 21. The air battery 20 may further comprise another air electrode current collector (for instance, foil-type current collector) for collecting electric charge collected by the mesh-type air electrode current collector.

3. The Third Embodiment

Figure 3:
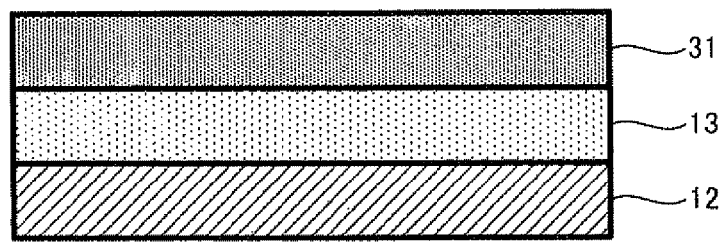
FIG. 3 is a plan schematically showing a cross section of an embodiment of air battery 30.

FIG. 3 is a plan schematically showing a cross section of the third embodiment of air battery of the present invention (hereinafter, referred to as "air battery 30".). In FIG. 3, a part of the air battery 30 is enlarged. In FIG. 3, the elements which are in common with those of the air battery 10 are given the same reference numerals as those shown in FIG. 1, and the descriptions are omitted. Therefore, about the air battery 30, only the air electrode 31 will be described.

<Air Electrode 31>

The air electrode 31 comprises a sheet-type HOPG and a catalyst is provided on the surface of the sheet-type HOPG. The D/G band ratio X of the sheet-type HOPG included in the air electrode 31 is $0.058 \leq X \leq 0.18$. With such air electrode 31, it is possible to provide an air battery 30 which can enhance the operating voltage. Moreover, a conductive substance (not shown), which functions as a terminal when removing electricity from the air battery 30, is connected to the air electrode 31.

Examples of the catalyst to be used for the air electrode 31 may be the catalyst used for the air electrode 21.

The thickness of the air electrode 31 varies depending on the intended use of the air battery 30; for example, it is preferably 2 μm or more and 2 mm or less, more preferably 5 μm or more and 500 μm or less. To easily enhance the operating voltage, the D/G band ratio X of the HOPG to be used for the air electrode 31 is preferably X=0.180.

EXAMPLES

Hereinafter, the invention will be more specifically described by way of the following examples.

Cells of Examples 1 and 2 as the air battery of the present invention as well as a cell of Comparative example 1 as the conventional air battery were prepared; then operating voltage of each cell was measured by carrying out discharge test.

(1) Calculation of D/G Band Ratio

Figure 4:
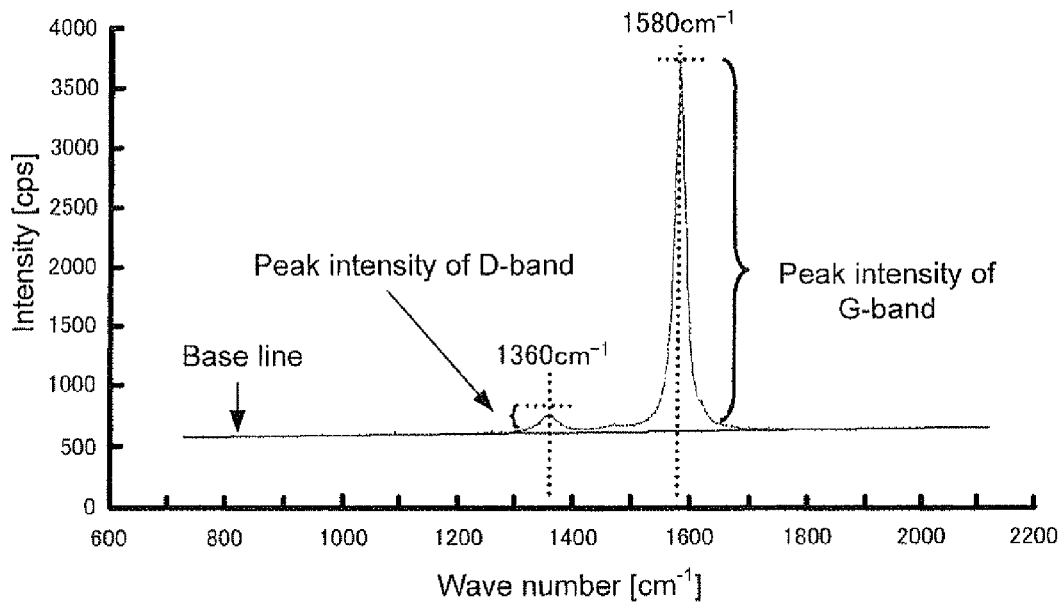
FIG. 4 is a graph showing a raman spectrum of an HOPG obtained by orientating the Basal face.

Raman spectroscopic analysis by measuring three selected points was carried out with respect to the Basal-face oriented HOPG, the Edge-face oriented HOPG, and a glassy carbon in which the Basal-face and the Edge-face orient randomly (respectively manufactured by BAS Inc.); and then the average of the ratio of the peak intensities of the D-band and G-band was calculated to obtain the D/G band ratio, respectively. Conditions of Raman spectroscopic analysis are shown as follows. In FIG. 4, a Raman spectrum of the Basal-face oriented HOPG is shown.

<Analysis Conditions>
  488 nm laser
  Output: 6 mW
  Diffraction grating: 1200 Gr/mm
  Objective lens: 40 magnifications
  Time of exposure: 10 seconds
  (2) Preparation of cells for evaluation Example 1

The cell of Example 1 was prepared by using the below described materials. More specifically, a beaker filled with an electrolytic solution was disposed under pure-oxygen atmosphere in a glass-made desiccators; and then, the air electrode and the anode were brought into contact with the electrolytic solution, to obtain the cell of Example 1. It should be noted that so as to supply oxygen to the air electrode, the top of the beaker is not sealed, but opened.

Air electrode: Basal-face oriented HOPG (manufactured by BAS Inc.)
  Anode: Li (manufactured by Honjometal Co, Ltd.)
  Electrolytic solution: a nonaqueous electrolytic solution obtained by dissolving $LiClO_4$ in propylene carbonate to be a concentration of 1 mole/L (manufactured by Kishida Chemical Co., Ltd.)
  Atmosphere: pure-oxygen (99.99%, 1 atmosphere)
  Cell: beaker cell Example 2

Except for using the Edge-face oriented HOPG (manufactured by BAS Inc.) as the air electrode, the cell of Example 2 was produced in the same manner as Example 1.

Comparative Example 1

Except for using the glassy carbon in which Edge-face and Basal-face orient randomly (manufactured by BAS Inc.) as the air electrode, the cell of Comparative example 1 was produced in the same manner as Example 1.

(3) Discharge Test

Figure 5:
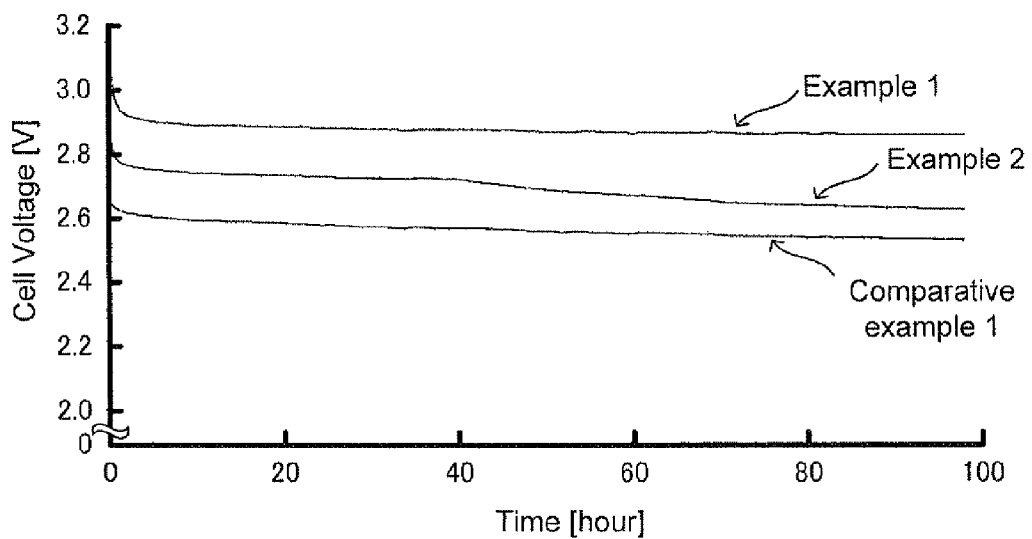
FIG. 5 is a graph showing a constant current discharge curve.

Through a terminal connected to the air electrode and the anode of the above cells, 50 $nA/cm^2$ of electric current was applied, and the voltage was monitored for 100 hours from the start. The constant current discharge curves are shown in FIG. 5; the D/G band ratio X and the results of discharge voltage after 100 hours from the start is shown in Table 1.

TABLE 1

|  | D/G band ratio X | Discharge Voltage after 100 hours from starting (V) |
|---|---|---|
| Example 1 | 0.058 | 2.63 |
| Example 2 | 0.180 | 2.86 |
| Comparative example 1 | 0.922 | 2.53 |

(4) Results

As shown in FIG. 5 and Table 1, by setting the D/G band ratio X within a range of $0.058 \leq X \leq 0.18$, it was possible to raise the discharge voltage (operating voltage) 0.1 V or more.

Moreover, by setting the D/G band ratio X at X=0.180, it was possible to raise the discharge voltage (operating voltage) 0.33V. Further, since the carbonaceous matter having the D/G band ratio X is X=0.058 and 0.180 was an HOPG, by using the HOPG as the air electrode, it was possible to raise the discharge voltage 0.1 V or more. By the increase of discharge voltage, the energy density of the battery is enhanced; so, according to the present invention, it is possible to provide an air battery which is capable of improving the energy density.

Industrial Applicability

The air battery of the present invention can be used for, for example, power source of electric vehicles and power source of mobile device.

| List of Reference Numerals | |
| --- | --- |
| 10 | air battery |
| 11 | air electrode |
| 12 | anode |
| 13 | electrolyte layer |
| 20 | air battery |
| 21 | air electrode |
| 30 | air battery |
| 31 | air electrode |

The invention claimed is:

1. An air battery comprising: an air electrode containing a carbonaceous matter; an anode; and an electrolyte layer containing an electrolyte which conducts ions between the air electrode and the anode, the electrolyte layer comprising an nonaqueous electrolytic solution and the D/G band ratio X of the carbonaceous matter being $0.058 \leq X \leq 0.18$.

2. An air battery comprising: an air electrode made of a carbonaceous matter; an anode; and an electrolyte layer containing an electrolyte which conducts ions between the air electrode and the anode, the D/G band ratio X of the carbonaceous matter being $0.058 \leq X \leq 0.18$.

3. The air battery according to claim 1, wherein the D/G band ratio X of the carbonaceous matter is X=0.180.

4. An air battery comprising: an air electrode containing a carbonaceous matter; an anode; and an electrolyte layer containing an electrolyte which conducts ions between the air electrode and the anode, the carbonaceous matter being a highly-oriented pyrolytic graphite.

5. An air battery comprising: an air electrode made of a carbonaceous matter; an anode; and an electrolyte layer containing an electrolyte which conducts ions between the air electrode and the anode, the carbonaceous matter being a highly-oriented pyrolytic graphite.

6. The air battery according to claim 2, wherein the D/G band ratio X of the carbonaceous matter is X=0.180.

* * * * *